May 7, 1963

G. E. GARD 3,088,713

BLENDING METHOD

Filed May 9, 1960

INVENTOR
GEORGE E. GARD by
Theodore L. Thomas

ATTORNEY 3,088,713
BLENDING METHOD
George E. Gard, East Hempfield Township, Lancaster County, Pa., assignor to Armstrong Cork Company, Lancaster, Pa., a corporation of Pennsylvania
Filed May 9, 1960, Ser. No. 27,958
4 Claims. (Cl. 259—18)

This invention relates generally to the blending of ingredients which are normally difficult to blend. More particularly the invention relates to the control of the relative amounts of ingredients in a mixture being conveyed at constant volume to a mold. Still more particularly the invention relates to controlling and varying the relative amounts of ingredients in a constant volume mixture containing cellular polystyrene particles.

Cellular polystyrene is widely used in the manufacture of cellular polystyrene blocks and other articles. Frequently in the manufacture of such products it is necessary that the cellular polystyrene particles being fed to a mold be admixed with another ingredient having physical properties which render the mixing of the particles into other ingredients difficult. For example, in the formation of artificial dielectric materials it is necessary to blend cellular polystyrene particles and small aluminum slivers to form a uniform mixture which is subjected to heat in a mold in order to form a monolithic block of uniform refractive index. It is also occasionally desirable to blend cellular polystyrene particles of one density with cellular polystyrene particles of another and different density. The blending of such dissimilar ingredients has proved a major problem.

It is the primary object of the present invention to supply a method for overcoming the difficulties in the above-described blending operations. It is a further object of the present invention to supply a method whereby cellular polystyrene particles may be blended to produce a mixture being fed at constant volume to a mold with hard-to-mix ingredients in order that the mold may be charged with feed having a different concentration of one or more of the ingredients from top to bottom in the mold.

These objects are accomplished in a strikingly effective manner. The invention contemplates passing through a first variable opening a first feed containing a mixture of cellular polystyrene particles and a second ingredient difficult to mix therewith. A second feed is passed through a second variable opening; this second feed is made up of cellular polystyrene particles alone. The first feed and the second feed are admixed subsequent to the passage of the two feeds through the variable openings. The variable openings are so controlled that the volume of the blended feed mixture remains constant.

Figure 1:
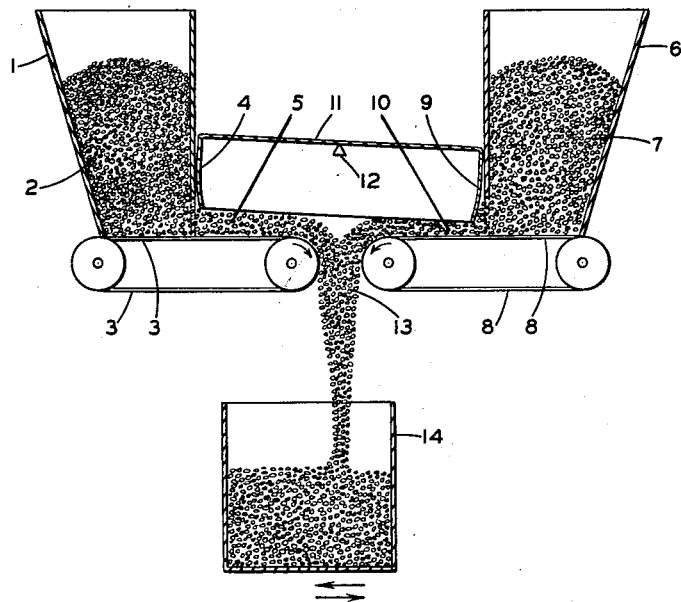
Figure 2:
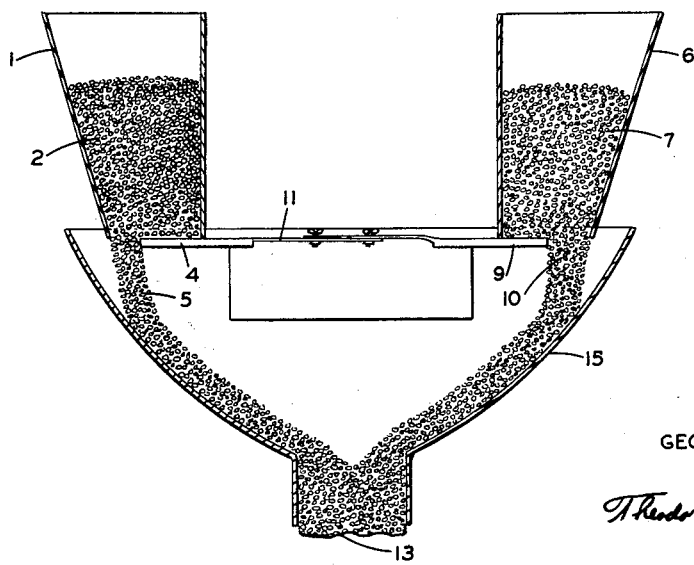

In the accompanying drawing:

FIG. 1 is a simplified sectional side elevation of one form of apparatus for controlling relative proportions of ingredients in the feed; and FIG. 2 is a sectional side elevation of a different form of the apparatus shown in FIG. 1.

Similar elements in the figures have the same numbers.

Referring to FIG. 1, there is contained in the hopper 1 a first feed 2 which, for the purposes of illustration, is made up of a mixture of cellular polystyrene particles and aluminum slivers, the slivers measuring approximately ⅜" by 5 mils by 0.5 mil. This first feed 2 rests upon a conveyor belt 3 which, when in motion, is adapted to carry the first feed 2 under the gate 4, the thickness of the bed of the first feed being controlled by the size of the opening 5 between the gate 4 and the conveyor belt 3.

A second hopper 6 contains cellular polystyrene particles which constitute the second feed 7. The second feed 7 rests on the second conveyor belt 8. The second feed 7 is carried under the second gate 9 through the second opening 10 which exists between the second conveyor belt 8 and the second gate 9. The first gate 4 and the second gate 9 are connected with a gate arm 11 which may be pivoted as at 12. This arrangement allows one gate to close as the other opens and thus maintains a constant volume of feed being carried along the first conveyor belt 3 and the second conveyor belt 8. The two feeds may be brought together in any convenient manner at the mixing point 13, from which the blended feed mixture falls into either a mold or charging box 14. The charging box 14 may be moved back and forth so that the blended feed mixture is evenly spread in layers as the charging box 14 is filled with the blended feed mixture.

It will be apparent that the gate arm 11 may be pivoted around the pivot 12 during the actual charging of the charging box 14 in accordance with any predetermined requirements for varying the concentration of the aluminum slivers from top to bottom in the charging box 14. The first opening 5 and the second opening 10 will always maintain a constant outlet area as the first gate 4 and the second gate 9 rise and fall as desired. During charging the first gate 4 and the second gate 9 may be moved up and down by means of the gate arm 11 by manual means, by mechanical means as with a cam or other suitable arrangement, or by electrical means. The aluminum slivers in the first feed 2 are thus more or less diluted by varying the amount of the second feed 7 which consists of cellular polystyrene particles.

FIG. 2 shows the first hopper 1, the first feed 2, the first gate 4, the first opening 5, the second hopper 6, the second feed 7, the second gate 9, and the second opening 10. The gate arm 11 is firmly affixed to the gates 4 and 9 in order that as the gate arm 11 slides back and forth, one gate is open further while the other is closed further. This arrangement again maintains the total area of the openings 5 and 10 constant, thus producing a constant volume of feed from both hoppers. The final feed mixture falls into the hopper 15 and is thereafter dropped into the oscillating charging box 14.

Where the cellular polystyrene particles and aluminum slivers are to be formed into a cube useful in the construction of a lens for electromagnetic radiation, it is found that the steam or other heating means to be employed in heating the cellular polystyrene beads in the mold will produce a density gradient in the final monolithic block. This density gradient results in an index of refraction gradient which, if sufficiently large, destroys the usefulness of the block in lens manufacture. However, by means of the present invention, the density gradient can be compensated for by increasing the dilution of the slivers commersurate with the increasing density of the polystyrene foam in the block. The result is a uniform index of refraction throughout the block despite the varying density throughout the block.

This invention is also useful in producing a uniform density in a straight polystyrene foam block by laying up a final feed mixture having a progressively different proportion of different densities of cellular polystyrene particles. Cellular polystyrene particles of different responses to heat are readily available by varying the conditions of prefoaming the particles, or by varying the length of storage time subsequent to prefoaming the particles. By correctly choosing these responses and programing the proportion, blocks and boards may be produced having a uniform density despite the usual density gradient produced by the steam pressure gradient necessary to form the pre-expanded particles into a monolithic block in a mold. Such precise control of density in the manufacture of blocks allows the production of polystyrene foam peculiarly useful as a packaging material for shock-sensitive articles.

The over-all result of this process is the improvement of the uniformity of a product wherein the process of making that product normally results in non-uniform physical properties principally along one axis. The layering technic described herein allows various complex programing lay-ups to compensate for wide process variations or to produce desired variations in the final product.

I claim:

1. A method of controlling relative amounts of ingredients in a blended feed mixture containing cellular polystyrene particles while said mixture is being conveyed at constant volume to a mold, said blended feed mixture containing in addition to said cellular polystyrene particles a second ingredient possessing sufficiently different physical properties from the cellular polystyrene particles as to be difficultly mixable therewith and which is to be present in said mold in varying concentrations from top to bottom of said mold depending on predetermined requirements, which method comprises passing through a first variable opening a first feed containing a mixture of said cellular polystyrene particles and said second ingredient, passing through a second variable opening a second feed of cellular polystyrene particles, admixing said first feed and said second feed to form said blended feed mixture subsequent to the passage of said first feed and said second feed through said variable openings, and adjusting the relative size of said first and said second variable openings to vary the concentration of said second ingredient in said blended feed mixture while maintaining the total outlet area of said first and said second openings constant.

2. A method according to claim 1 wherein said second ingredient comprises aluminum slivers.

3. A method according to claim 1 wherein said first feed comprises a blend of cellular polystyrene particles having at least two different densities, and said second feed comprises cellular polystyrene particles having the same density as one of the cellular polystyrene particles in said first feed.

4. A method according to claim 1 wherein said first and said second feeds pass through said first and said second variable openings onto conveyor belts.

References Cited in the file of this patent

UNITED STATES PATENTS

| | | |
|---|---|---|
| 1,215,559 | Leake | Feb. 13, 1917 |
| 1,780,589 | Hendrix | Nov. 4, 1930 |
| 2,023,204 | Munters et al. | Dec. 3, 1935 |
| 2,145,133 | Riney et al. | Jan. 24, 1939 |
| 2,296,917 | Garrett et al. | Sept. 29, 1942 |
| 2,623,658 | Johansen | Dec. 30, 1952 |
| 2,670,187 | Goodrich | Feb. 23, 1954 |
| 2,741,401 | Kehres et al. | Apr. 10, 1956 |
| 2,864,537 | Throop et al. | Dec. 16, 1958 |
| 2,900,109 | Hoopes et al. | Aug. 18, 1959 |